United States Patent
Schulze et al.

(10) Patent No.: US 6,755,947 B2
(45) Date of Patent: Jun. 29, 2004

(54) APPARATUS FOR GENERATING OZONE, OXYGEN, HYDROGEN, AND/OR OTHER PRODUCTS OF THE ELECTROLYSIS OF WATER

(76) Inventors: Dirk Schulze, Langenbachstraβe 2, De-53113 Bonn (DE); Wolfgang Beyer, Bergstraβe 35, DE-53359 Rheinbach (DE)

( * ) Notice: Subject to any disclaimer, the term of this patent is extended or adjusted under 35 U.S.C. 154(b) by 50 days.

(21) Appl. No.: 10/144,247

(22) Filed: May 10, 2002

(65) Prior Publication Data

US 2003/0007909 A1 Jan. 9, 2003

(30) Foreign Application Priority Data

May 10, 2001 (DE) ..................................... 201 07 921 U (51) Int. Cl.[7] ............................................... B23H 11/00
(52) U.S. Cl. .................... 204/275.1; 204/242; 204/263; 204/269; 205/626; 205/628
(58) Field of Search ................ 205/626, 628, 205/633, 637; 204/275.1, 242, 263, 269

(56) References Cited

U.S. PATENT DOCUMENTS

| | | | |
|---|---|---|---|
| 5,779,865 A | | 7/1998 | Schulze et al. |
| 5,833,842 A | * | 11/1998 | Fields .......................... 210/85 |
| 2002/0070123 A1 | * | 6/2002 | Andrews et al. ............. 205/626 |

FOREIGN PATENT DOCUMENTS

| | | |
|---|---|---|
| DE | 296 22 519 U1 | 4/1997 |
| DE | 196 33 342 A1 | 2/1998 |
| DE | 196 06 606 | 5/1999 |

* cited by examiner

Primary Examiner—Wesley A. Nicolas
(74) Attorney, Agent, or Firm—Pauley Petersen & Erickson (57) ABSTRACT

An apparatus for generating ozone, oxygen, hydrogen, and/or other products of water electrolysis, having an electrolyte cell that can be acted upon by water. The water is delivered and carried away in a supply line communicating with the electrolyte cell, wherein a bypass line is embodied around the supply line. The electrolyte cell can be connected via the bypass line to the supply line and subjected to water from the supply line. A valve engaging the supply line and the bypass line is provided, and with the valve, the supply line and the bypass line can be opened and/or closed.

23 Claims, 4 Drawing Sheets

APPARATUS FOR GENERATING OZONE, OXYGEN, HYDROGEN, AND/OR OTHER PRODUCTS OF THE ELECTROLYSIS OF WATER

BACKGROUND OF THE INVENTION

1. Field of the Invention

This invention relates to an apparatus for generating ozone, oxygen, hydrogen, and/or other products of water electrolysis, having an electrolyte cell that can be acted upon by water, the water being delivered and carried away in a supply line communicating with the electrolyte cell.

According to this invention, the term "water" that is delivered to the electrolyte cell is understood to be fully desalinated water, pure water or superpure water, of the quality used for instance in the cosmetics and pharmaceutical industry, the electronics and semiconductor industry, and medical technology.

2. Description of Related Art

Apparatuses of the type mentioned above, in which preferably ozone and/or oxygen are generated by an electrolyte cell in water, are known in many forms as taught by German Patent Disclosure DE 196 06 606 A1 and U.S. Pat. No. 5,779,865. Such apparatuses are used to inoculate the supplied water with ozone, in order to make the water usable for applications in medical technology, such as hemodialysis, and so forth. Flow rates of 1 to 3 $m^3/h$ of water, for instance, are inoculated with the ozone generated in the electrolyte cell in a manner known.

In the operation of such electrolyte cells, however, regular maintenance is necessary, which in the prior art apparatuses requires a complicated detachment of the electrolyte cell from the supply line for the water, so that the further flow of water through the supply line is also disrupted for the duration of the maintenance work.

SUMMARY OF THE INVENTION

One object of this invention is to refine an apparatus of the known type such that maintenance of the electrolyte cell can be performed without major assembly work, and in which the flow of water through the supply line can be maintained unhindered.

For attaining this object, according to this invention a bypass line is embodied around the supply line, and the electrolyte cell can be connected via the bypass line to the supply line and subjected to water from the supply line. There is a valve engaging the supply line and the bypass line, and with the valve, the supply line and the bypass line can be opened and/or closed.

According to this invention, the electrolyte cell is thus supplied with water which is diverted from the supply line via the bypass line and which, after the generation of ozone and/or oxygen in the water, is returned again to the main stream in the supply line, so that the desired inoculation (enrichment) of the water with the applicable quantity of ozone is possible. If maintenance or an interruption in operation of the electrolyte cell becomes necessary, all that is required is that the bypass line be interrupted; an unhindered further flow of water through the supply line can be maintained.

In one embodiment of this invention, the valve is embodied as a conical stopcock with a housing and a stopcock plug that is rotatable about its longitudinal axis. The stopcock plug penetrates the supply line and the bypass line and, as a function of the rotary position of the stopcock plug, has various switching positions for opening or closing the supply line and/or the bypass line.

Valves embodied as a conical stopcock are known. According to this invention, only a single valve, which is structurally inexpensive and requires little space, is used. By simultaneous action of the stopcock plug on the supply line and the bypass line, by actuation of the single valve, various switching positions that are advantageous for the apparatus of this invention are attained.

In one embodiment of this invention, the housing has a through conduit for the supply line and bypass conduits for the bypass line and also has a recess, penetrating the supply line and the bypass line, which recess receives the stopcock plug. The stopcock plug has a through bore and conduits spaced apart from the through bore, and the through bore and the conduits extend transversely to the longitudinal axis of the stopcock plug. As a function of the rotary position of the stopcock plug, the through bore of the stopcock plug can communicate with the through conduit of the housing, and the conduits of the stopcock plug can be made to communicate with the bypass conduits of the housing.

According to this invention, a first switching position is possible, in which the supply line and the bypass line are opened. This corresponds to an operative position in which the electrolyte cell is supplied with water via the bypass line, and through the processes proceeding there, ozone and/or oxygen is generated, which is introduced into the main stream of water carried via the supply line. In the second switching position, according to this invention, of the valve, both the supply line and the bypass line are closed, which can be utilized for instance to block off the supply line. In a third switching position, according to this invention, of the valve, only the supply line is opened, while the bypass line is closed, making assembly and maintenance of the electrolyte cell possible without a need to interrupt the unhindered flow of water through the supply line.

The valve can be actuated in manifold ways; manual actuation with a handle is advantageous. Automated actuation of the valve can equally be provided, by suitable rotary drive mechanisms. In one embodiment of this invention, the stopcock plug protrudes at its upper end beyond the housing and has a handle for manual actuation.

If the valve is actuated manually, the handle can be locked in the various switching positions of the valve by a suitable detent mechanism, so that the switching positions can always be precisely found. For instance, the individual switching positions of the valve can be locked for each time by means of a 90° rotation of the stopcock plug about its longitudinal axis and of the handle of the valve acting on the stopcock plug. The 90° increments can be adhered to exactly because of the detent means, as later described in further detail.

Means for detecting the switching position of the valve which are capable of sending the switching position on to a control unit of the electrolyte cell can also be provided.

In an embodiment of this invention, the stopcock plug, on its lower end opposite the end equipped with the handle, has a connection flange for securing the electrolyte cell.

In a preferred embodiment of the valve, the stopcock plug, on its lower end, has an open recess, which serves as a reservoir chamber for the water, and the conduits of the stopcock plug discharge into the reservoir chamber. The reservoir chamber forms a portion of the bypass line inside the stopcock plug.

Thus the electrolyte cell is secured simply to the stopcock plug of the valve, and the reservoir chamber that is open toward the connection flange is supplied with water from the bypass line, and the reservoir chamber of the stopcock plug communicates with the electrolyte cell. The reservoir chamber thus serves to deliver the water to the electrolyte cell, in order to bring about the desired generation of ozone and/or oxygen in it. Because of the reservoir chamber, an adequate quantity of water can be kept in reserve for the electrolyte cell. The reservoir chamber preferably forms a portion of the bypass line, and the water carried through the bypass line flows through it.

Thus according to this invention, the bypass line is embodied inside the housing with a first bypass conduit, which branches off from the through conduit in the region of the inflowing water and extends as far as the recess that receives the stopcock plug. With a second bypass conduit, which branches off from the through conduit in the region of the outflowing water and which also extends as far as the recess that receives the stopcock plug, and the stopcock plug, beginning at its circumference, has the conduit for the inflow of the water into the reservoir chamber and with the conduit for the outflow of the water from the reservoir chamber as far as the circumference of the stopcock plug. Depending on the switching position of the valve in accordance with the rotary position of the stopcock plug about its longitudinal axis, the bypass conduits of the housing communicate with the conduits of the stopcock plug, thus forming the bypass line.

In a preferred embodiment, the conduit carrying outflow of water from the reservoir chamber leads away from the uppermost point of the reservoir chamber, and the conduit for the inflow of water into the reservoir chamber enters the reservoir chamber in the middle region thereof.

The bypass line is preferably, like the supply line, embodied inside the housing of the valve. The bypass line includes one portion for the inflow of water in the direction of the electrolyte cell and one portion for the outflow of the water, enriched with ozone and/or oxygen, from the electrolyte cell. These portions each communicate with different circumferential regions of the stopcock plug, depending on the position of the stopcock plug. The stopcock plug accordingly has one conduit for the inflow of water to the electrolyte cell and for communication with one portion of the bypass line in the housing, and a further conduit for the outflow of the water from the electrolyte cell and for communication with the further bypass conduit in the housing, and also has a reservoir chamber which connects the two conduits of the stopcock plug and is embodied in the stopcock plug. The reservoir chamber of the stopcock plug communicates directly with the electrolyte cell, and the water from the reservoir chamber acts directly upon the anode of the electrolyte cell.

The electrolyte cell can have a structure known, for instance as described in German Patent Reference DE 196 06 606 A1. According to this invention, a multi-part structure is preferred, with a solid-state electrolyte membrane disposed between an anode and a cathode, and the anode is in contact with the water introduced into the reservoir chamber of the stopcock plug.

In another embodiment of the apparatus of this invention, leading away from the bypass line, which returns from the electrolyte cell to the supply line for the outflowing water, is a branch line which extends out of the housing. With this branch line, water enriched with ozone and/or oxygen can be diverted.

BRIEF DESCRIPTION OF THE DRAWINGS

This invention is described below in further detail in view of an embodiment shown in the drawings, wherein:

FIG. 1b is a rear view of the apparatus of FIG. 1a;

FIG. 1c is a top view of the apparatus of FIG. 1a;

DESCRIPTION OF PREFERRED EMBODIMENTS

Figure 1A:
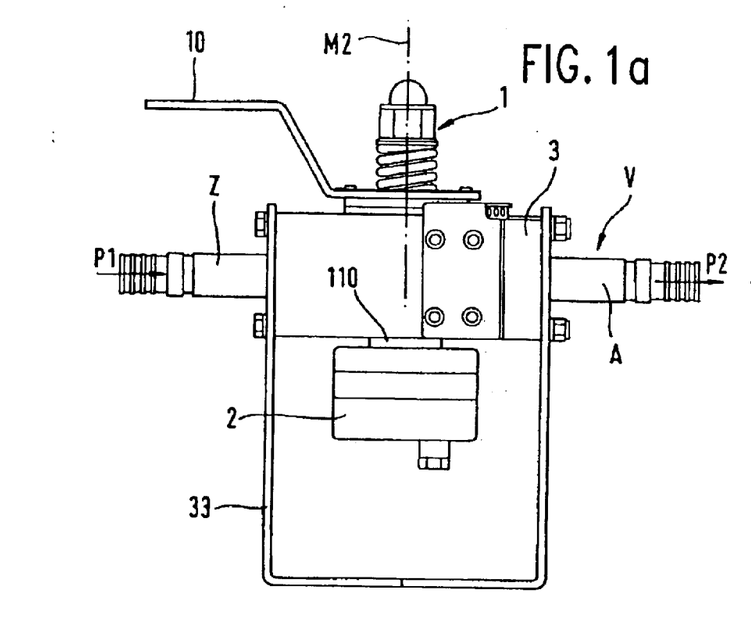
FIG. 1a is a front view of an apparatus for generating ozone, oxygen, hydrogen, with a valve and an electrolyte cell.
Figure 1B:
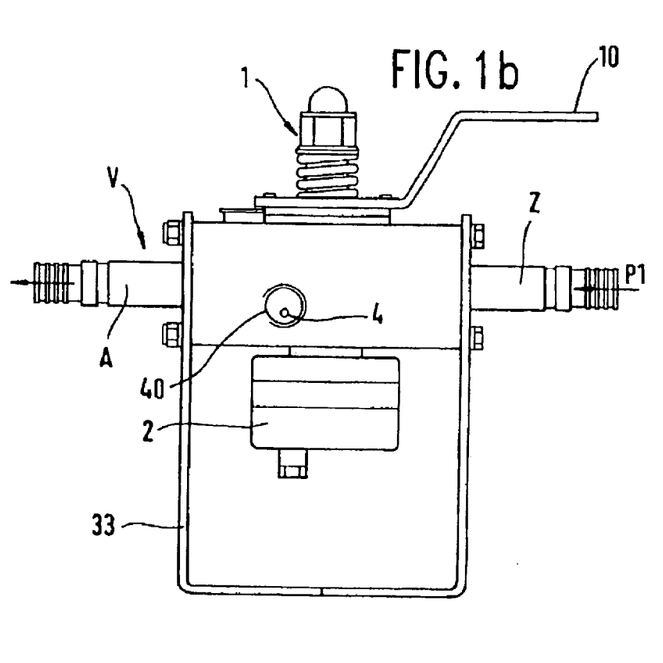
Figure 1C:
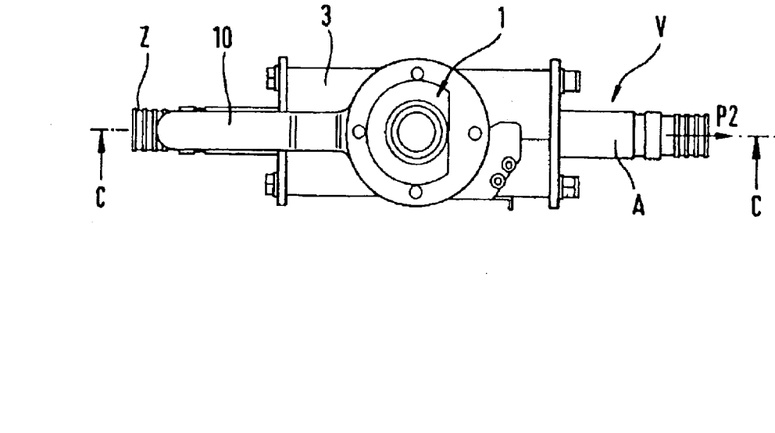

In FIGS. 1a through 1c, the structure of an apparatus according to this invention for generating ozone, oxygen, hydrogen and/or other products of the electrolysis of water is shown. The apparatus includes a valve 1, which is accommodated in a housing 3, and the housing 3 is secured in a mount 33. A handle 10 is disposed on the upper end of the valve 1, the end protruding from the housing 3, and with the handle 10 the valve 1 can be rotated about its longitudinal axis M2 in order to attain various switching positions. The supply line is connected by its inlet Z to the housing 3 and extends away from the housing 3 via the outlet A. On the underside, the valve 1 protrudes out of the housing 3 with a connection flange 110, to which the electrolyte cell 2 is secured. The water is delivered in the direction P1 via the supply line V and through the housing 3 and the valve 1 reaches the electrolyte cell 2 and from there reaches the outlet A and is carried away in the direction of the arrow P2.

Figure 2:
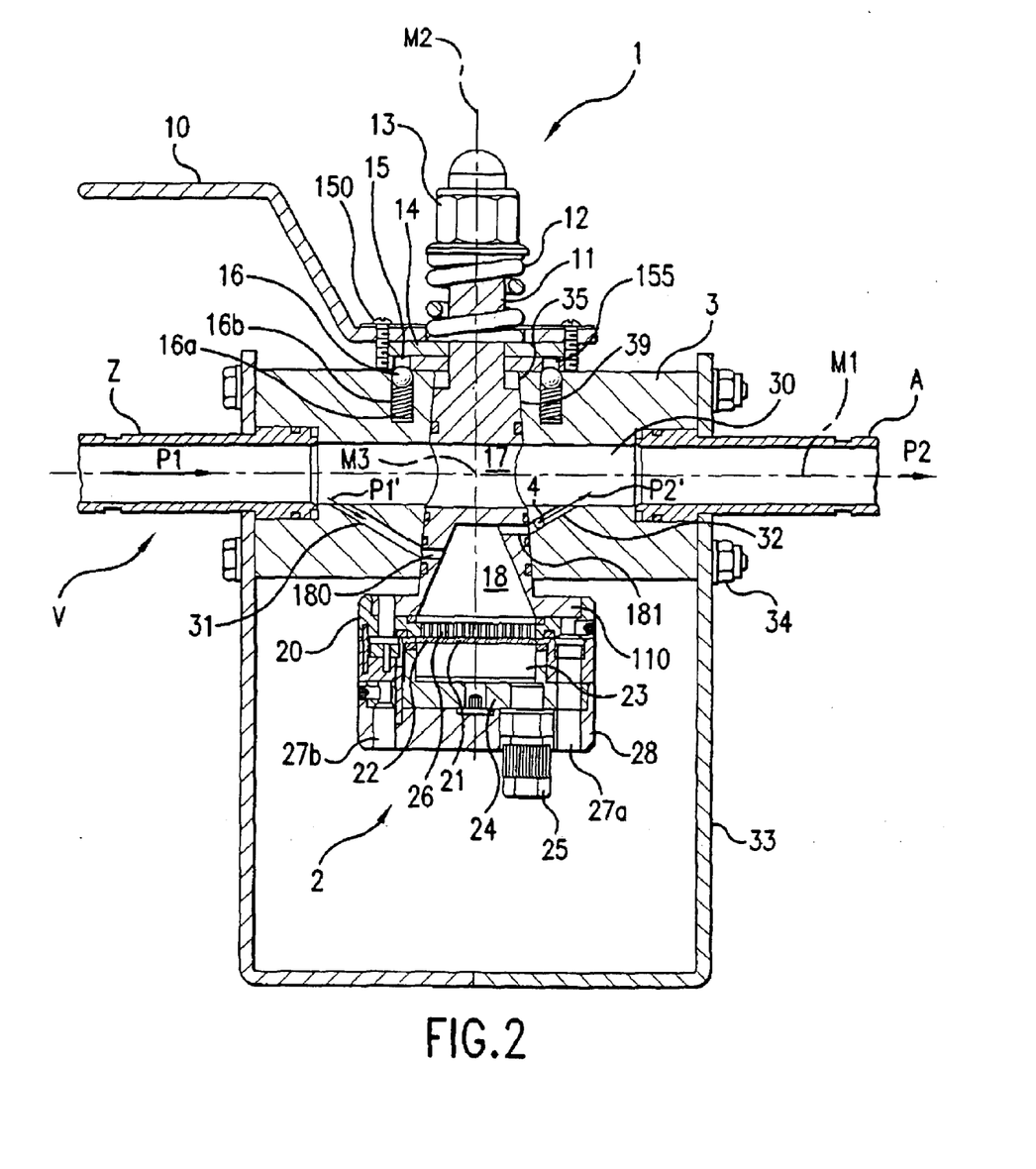
FIG. 2 shows a cross section taken along line CC through the apparatus of FIGS. 1a through 1c in the operative position, with both the supply line and the passable bypass line open.

In FIG. 2, the apparatus is shown in the vertical section taken along line CC of FIG. 1c, in one embodiment.

The apparatus includes a housing 3, which along a horizontally extending longitudinal axis M1 has the through conduit 30 for the water. The through conduit 30 forms one part of the supply line V. The through conduit 30 is adjoined on one side by the inlet line Z and on the opposite side by the outlet line A. The through conduit 30, the inlet line Z and the outlet line A form the supply line V, through which the water is delivered in the direction of the arrow P1 and is carried away in the direction of the arrow P2. The supply line V is embodied as a ring line, for instance, and leads to the devices to be supplied with the water enriched with ozone and/or oxygen. The apparatus further includes the valve 1, embodied as a conical stopcock with a stopcock plug 11 disposed in the recess 39 of the housing 3. The recess 39 penetrates the housing 3 perpendicular to the longitudinal axis MI of the through conduit 30. The housing 3 simultaneously acts as the stopcock body for the valve 1 embodied as a conical stopcock. The longitudinal axis M2 of the stopcock plug 1 extends perpendicular to the longitudinal axis M1 of the through conduit 30 in the housing 3. With its upper end, the stopcock plug 11 protrudes beyond the housing 3, and with its lower end it also protrudes out of the recess 39 of the housing 3. A protruding connection flange 110 is embodied on the lower end of the stopcock plug 11.

The stopcock plug 11 is embodied with a through bore 17, which is disposed approximately in the middle region and extends transversely to the longitudinal axis M2 of the stopcock plug 11 and is axially parallel to the through conduit 30 of the housing 3. The center axis M3 of the through bore 11 is in the same plane as the of the through conduit 30 of the housing 3. The stopcock plug 11 is equipped, on its upper end protruding out of the housing 3, with a lever or handle 10. With the handle 10, the stopcock plug 11 can be rotated about its longitudinal axis M2 in the housing 3. The opposite end of the stopcock plug 11 from the handle 10 has the protruding connection flange 110 on its face end. Beginning at the face end having the connection flange 110, a recess 18 in the stopcock plug 11 is formed, such as a funnel, which acts as a reservoir chamber 18 for the water. Conduits 180, 181 lead away from the recess 18 and in terms of the sectional plane are located on opposite sides of the recess 18. The conduits 180, 181 extend essentially transversely to the longitudinal axis M2 of the stopcock plug 11 and extend through as far as the outer circumference of the stopcock plug 11. One conduit 181, which serves as an outlet conduit for the outflow of the water enriched with ozone and/or oxygen from the reservoir into the supply line, originates at the lowest region of the recess 18, or in other words the highest point, while the other conduit 180, which serves to provide the inflow of water from the supply line into the reservoir, is embodied approximately in a middle region of the recess 18. The conduits 180 and 181 are embodied in the stopcock plug 11 in the region between the through bore 17 and the connection flange 110. The stopcock plug 11 is sealed off from the recess 39 in the housing by sealing rings 37.

The electrolyte cell 2 is secured to the connection flange 110 of the stopcock plug 11, for instance by being screwed to it. The electrolyte cell 2 for generating ozone and/or oxygen in the water has a known multi-part structure, and as its essential components, it includes an anode holder 20 for mounting an anode 21 and yoke body 24 for mounting a cathode 23, which are screwed together. The anode holder 20 is platelike and has a plurality of perforations 26 in the middle region. Between the anode 21 and the cathode 23, a solid-state electrolyte membrane 22 is provided, which brings about the desired generation of ozone and/or oxygen in the water, when the electrolyte cell 2 is connected to a source of electrical voltage. The yoke body 24 has on the outside a cathode covering 28. The bores 27a and 27b, through which the voltage source, not shown, for the electrolyte cell 2 can be connected by a respective lead line to the anode holder 20 and the yoke body 24 for the cathode 23, extend through the cathode covering 28. A connection screw fastening 25 can also be seen, by way of which upon electrolysis in the electrolyte cell 2, hydrogen, for instance, that is produced can be carried away. The electrolyte cell 2 is screwed by the anode holder 20 to the connection flange 110 of the stopcock plug 11. The solid-state electrolyte membrane 22 communicates, via the anode 21 and the perforations 26 in the anode holder 20, with the reservoir chamber 28 of the stopcock plug 11, with the water located in the reservoir chamber 18. The electrolyte cell 2 is thus subjected to water from the reservoir chamber 18.

For delivering the water, arriving in the housing 3 in the direction of the arrow P1, to the electrolyte cell 2, a bypass line is embodied inside the housing 3, bypassing the through conduit 30 for the water, which forms the supply line. The bypass line includes a bypass conduit 31, which branches off from the through conduit 30 of the housing 3 adjacent to the inlet line Z and which extends as far as the recess 39 in the housing 3, in which recess the stopcock plug 11 is seated. A further bypass conduit 32 branches off from the through conduit 30 near the outlet line A and likewise extends to the recess 39, receiving the stopcock plug 11, of the housing 3. The bypass conduit 32 embodied for the outflow of the water is embodied in the flow direction P1 of the water by the supply line downstream of the stopcock plug 11, and the bypass conduit 31 embodied for the inflow of the water is embodied in the flow direction P1 of the water by the supply line upstream of the stopcock plug 11.

In the position of the valve shown in FIG. 2, the bypass line is passable or open. The bypass line is formed by the bypass conduit 31, beginning at the through conduit 30, the conduit 180 of the stopcock plug, the reservoir chamber 18 of the stopcock plug, the conduit 181 branching off from the uppermost region of the stopcock plug, and the bypass conduit 32, communicating with it, which again discharges into the through conduit 30. The discharge points of the bypass conduits 31 and 32 into the recess 39, in which the stopcock plug 11 is seated, are disposed so that they can communicate with the inlets and outlets of the conduits 180 and 181 of the stopcock plug 11 that lead to the reservoir chamber 18, as FIG. 2 shows. The water diverted from the supply line and the through conduit 30 flows in the direction of the arrow P1' through the bypass line and reaches the reservoir chamber 18, from where it enters into contact with the connected electrolyte cell 2. The ozone and/or oxygen thus produced rises through the water in the reservoir 18 to the uppermost point, where together with water it is re-introduced through the conduit 181 and the bypass conduit 32 into the through conduit 30 in the direction of the arrow P2' and into the supply line, and can be carried in the direction of the arrow P2 to the desired devices.

To maintain the flow in the directions P1, P2 in the supply line V, a pump, not shown, and assigned to the supply line is provided.

The water delivered to the housing 3 in the supply line V in the direction of the arrow P1 is delivered to the electrolyte cell 2 by being diverted from the supply line V of the bypass line, and after enrichment with ozone and/or oxygen, it is returned to the supply line again in a circulatory system.

Accordingly, the bypass line is formed by the bypass conduit 31 in the housing 3, the inlet conduit 180 of the stopcock plug, the reservoir chamber 18, the outlet conduit 180 of the stopcock plug, and the bypass conduit 32 in the housing leading to the through conduit 30. Water is thus diverted from the supply line V via the bypass conduit 31 and, after inoculation with ozone and/or oxygen, is returned again via the bypass conduit 32 to the through conduit 30 and the supply line V.

In FIG. 1 and FIG. 2, the switching position of the valve and the stopcock plug 11 is shown in which water is continuously enriched by the apparatus with ozone and/or oxygen generated in the electrolyte cell 2. This is the normal operation when the valve is open, which will be called the first switching position.

For interrupting the bypass line 31, 180, 18, 181, 32 or for interrupting the through conduit 30, the position of the stopcock plug 11 in the housing 3 must be changed by rotating the stopcock plug 11 about its longitudinal axis M2. To change the switching positions, the stopcock plug 11 is supported rotatably about its longitudinal axis M2 in the housing 3. A first, lower cam disk 15 is thus placed over the upper end, protruding from the housing 3, of the stopcock plug 11, and over the lower cam disk 15 a second upper cam disk 14 is placed, and they are screwed to the housing 3 by a cap nut 13 counter to the pressure of a compression spring 12 disposed over them. The stopcock plug 11 is thus secured rotatably about its longitudinal axis M2. For manual actuation of the stopcock plug 11, a handle 10 is provided, which is solidly connected to the upper and lower cam disks 14, 15 via screws 150.

Figure 3:
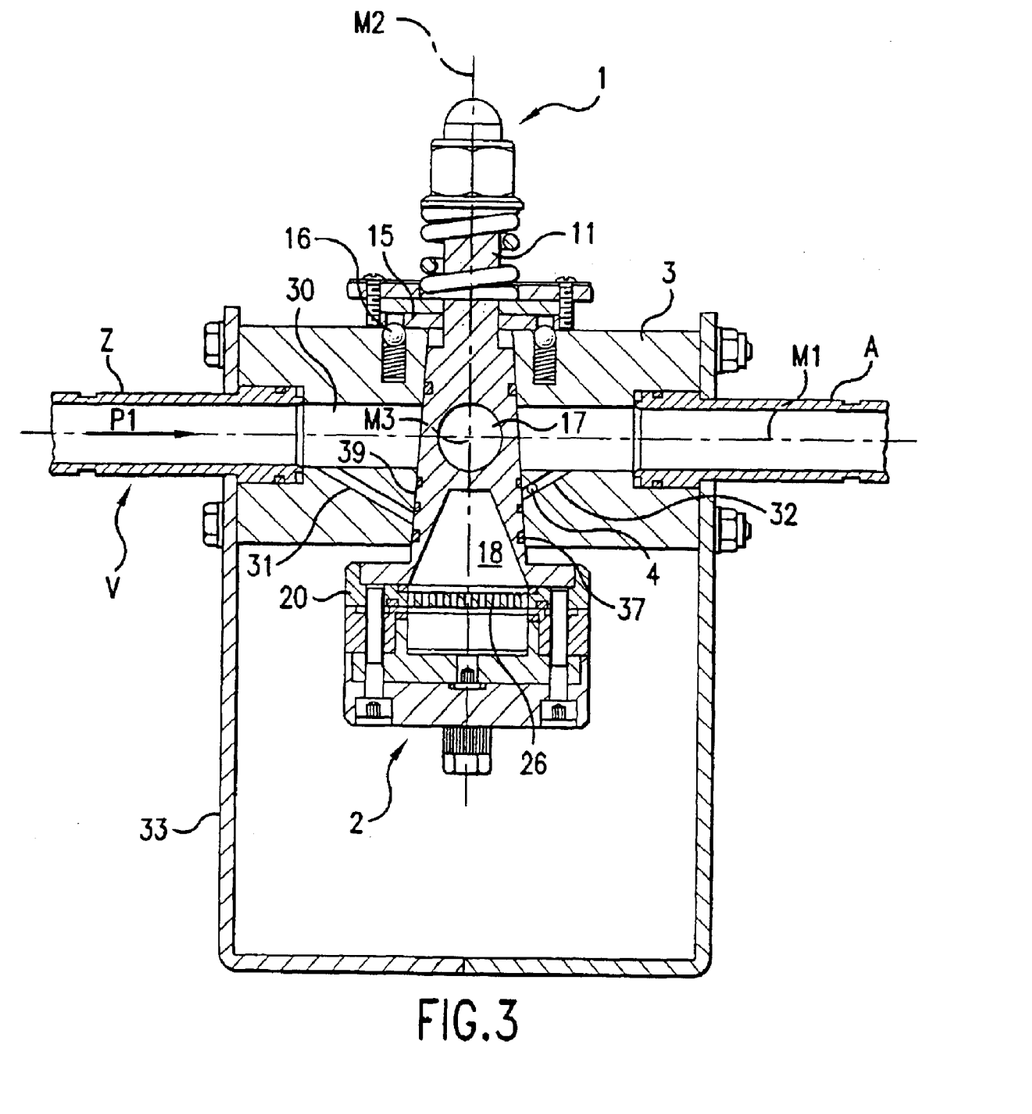
FIG. 3 shows a cross section taken through the apparatus of FIG. 2, but with the stopcock plug rotated 90° about its longitudinal axis, and with the supply line and the bypass line interrupted or closed.

If the handle 10 in the position of FIG. 2 is now rotated by 90°, and the stopcock plug 11 is thus also rotated 90° about its longitudinal axis M2, the operating position of FIG. 3 is reached. FIG. 3 shows the valve 1 in the closed position where the through conduit 30 is interrupted, and the bypass line is also interrupted. The conduits 180 and 181 no longer communicate with the bypass conduits 31, 32 of the housing 3.

Figure 4:
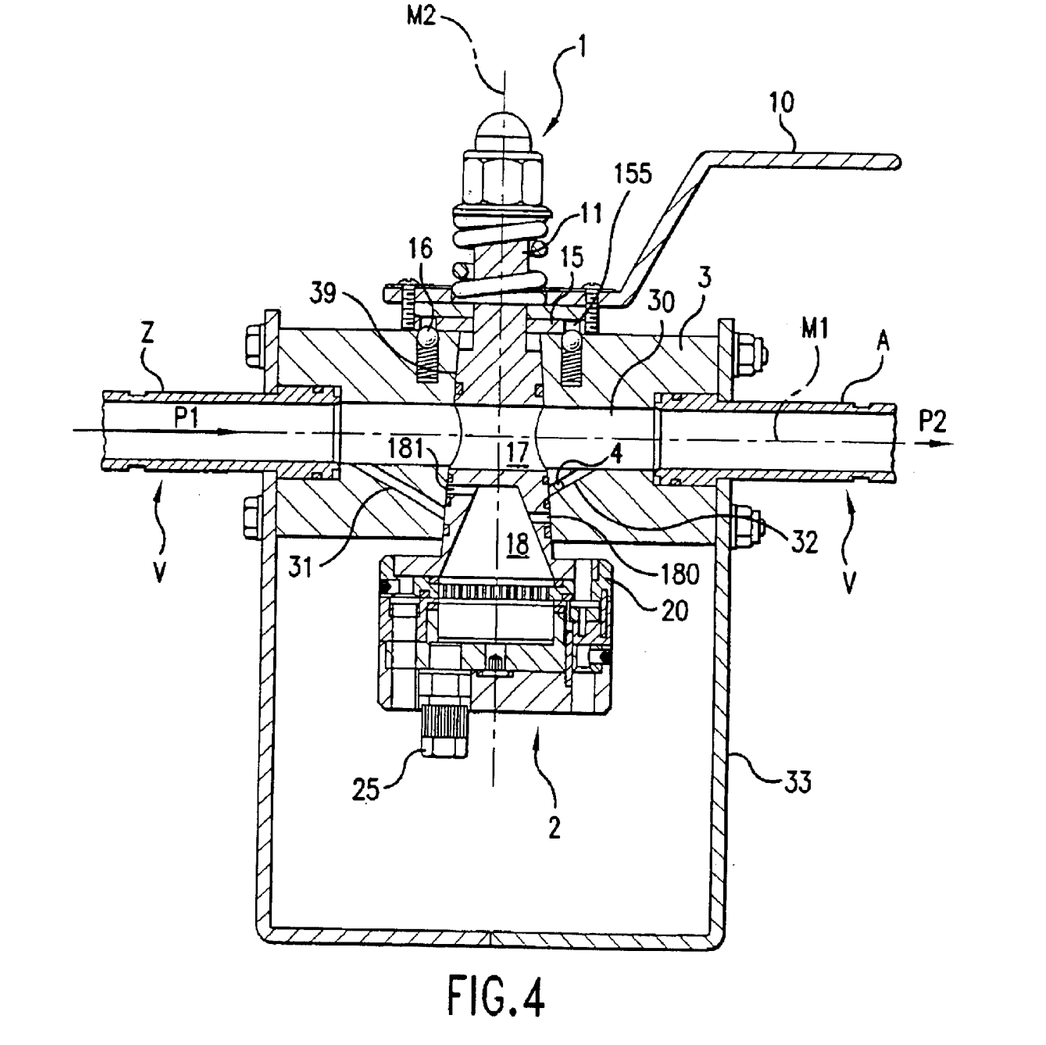
FIG. 4 shows a cross section taken through the apparatus of FIG. 2, but with the stopcock plug rotated 180° about its longitudinal axis, and with the supply line open and the bypass line interrupted or closed.

If the handle 10 of FIG. 3 is now rotated 180°, and thus the stopcock plug 11 is also rotated 180° about its longitudinal axis M2, the third switching position is obtained, which is the position shown in FIG. 4. FIG. 4 shows the valve in the open position where the through conduit 30 is open, and the water can flow through the supply line V through the housing 3 and the valve in the direction of the arrows P1, P2. However, the bypass line is interrupted and no water can be diverted via the bypass line 31, because the bypass line 31 in the region of the stopcock plug 11 is interrupted and closed.

When the valve is open, the through bore 17 of the stopcock plug 11 is oriented so that with its longitudinal axis M2, it is aligned with the longitudinal axis M1 of the through conduit 30, and a flow of the water through the through conduit 30 of the supply line V in the direction of the arrows P1 and P2 is possible.

In the third switching position shown in FIG. 4, the bypass line is interrupted, because the inlet conduit 180 and outlet conduit 181 of the stopcock plug 11 no longer communicate with the bypass conduit 31 and the bypass conduit 32, respectively. The bypass line extended via the reservoir chamber 18 is interrupted in FIG. 4, and consequently the electrolyte cell 2 is no longer acted upon by water. In this switching position of FIG. 4, a flow of the water through the through conduit 30 of the supply line is thus possible without hindrance. But the electrolyte cell 2 is sealed off from subjection to water via the bypass line, so that maintenance work can be performed on the electrolyte cell 2, without water escaping from the supply line.

In FIG. 3, a second switching position is shown, located between the switching positions of FIGS. 2 and 4, and in it the stopcock plug 11 is rotated 90° each, to the right or the left, compared to the switching positions of FIGS. 2 and 4. In this switching position shown, not only is the bypass line between the bypass conduit 31 and the bypass conduit 32 interrupted, but the through bore 17 of the stopcock plug 11, which is associated with the through conduit 30 of the supply line, also extends transversely to the longitudinal axis M1 of the through conduit 30, so that no flow of water through the through conduit 30 of the supply line is possible. In this switching position shown in FIG. 3, accordingly both the flow of water through the through conduit 30 of the supply line and the flow of water through the bypass line are interrupted, so that the entire apparatus is out of operation.

The various switching positions explained above, which can all be reached successively by respective 90° rotations of the stopcock plug 11 about its longitudinal axis M2, are also characterized by a detent mechanism, so that the handle 10 for actuating the stopcock plug 11 snaps into each of the switching positions shown. Thus the lower cam disk 15 has a total of four bores 155, located on a common circle and each forming a 90° angle, into which detent balls 16 loaded with springs 16a snap when a desired switching position is reached. The spring-loaded balls 16 are thus placed at the top in the housing 3 in suitable blind bores 16b. In addition, switching devices, not shown here, may also be provided, such as microswitches, which detect the particular switching position of the valve 1 activated at the time and which can report to the controller of the electrolyte cell 2, so that the electrolyte cell 2 can be subjected to electrical voltage or not, as a function of the switching position of the valve 1, for example.

A branch line 4 is also provided which originates at the bypass conduit 32. In the bypass conduit 32, the water enriched with ozone and/or oxygen is returned to the supply line again. It is thus possible for water enriched with ozone and/or oxygen to be diverted from the bypass conduit 32 and directed to some other use than the supply line V.

The branch line 4 leads from the bypass conduit 32 through the housing 3 and ends in a connection 40, as shown in FIG. 1 b, for a line, not shown, with a small diversion pump. From the connection 40, water with ozone and/or oxygen, carried away via the branch line 4, is delivered for example to a buffer tank or a sterilizer. Even if the supply line V is shut off, it is possible for water enriched with ozone and/or oxygen to be drawn from the branch line 4 by a branch pump.

The entire apparatus can be secured universally, for instance, to an underlying support or a wall in the desired installed position by means of a framelike mount 33 screwed to the housing 3.

With the apparatus of this invention, it is possible for fully desalinated water, pure water or superpure water, or other water qualities, depending on the type of electrolyte cell used, to be treated for applications in the cosmetics, pharmaceutical, electronics or semiconductor industry as well as medical technology. Applications for process water, drinking water, water for industrial or household use, and waste water are also conceivable.

What is claimed is:

1. In an apparatus for generating at least one of ozone, oxygen, hydrogen and other products of electrolysis of water, having an electrolyte cell that can be acted upon by water, the water being delivered and carried away in a supply line communicating with the electrolyte cell, the improvement comprising: a bypass line embodied around the supply line, the electrolyte cell connectable via the bypass line to the supply line and subjected to the water from the supply line, and a valve engaging the supply line and the bypass line and by the valve, the supply line and the bypass line can be at least one of opened and closed, the valve (1) having a conical stopcock with a housing (3) and a stopcock plug (11) rotatable about a longitudinal axis (M2), the stopcock plug (11) penetrating the supply line and the bypass line and as a function of a rotary position of the stopcock plug (11), and the valve (1) having various switching positions for opening or closing at least one of the supply line and the bypass line.

2. In the apparatus of claim 1, wherein the housing (3) has a through conduit (30) for the supply line and bypass conduits (31, 32) for the bypass line and has a recess (39), penetrating the supply line and the bypass line, the recess (39) receives the stopcock plug (11), the stopcock plug (11) has a through bore (17) and conduits (180, 181) spaced apart from the through bore (17), the through bore (17) and the conduits (180, 181) extend transversely to the longitudinal axis (M2) of the stopcock plug (11), as a function of the rotary position of the stopcock plug (11) the through bore (17) of the stopcock plug (11) can communicate with the through conduit (30) of the housing (3), and the conduits (180, 181) of the stopcock plug (11) can communicate with the bypass conduits (31, 32) of the housing (3).

3. In the apparatus of claim 1, wherein in a first switching position of the valve the supply line and the bypass line are opened, in a second switching position of the valve the supply line and the bypass line are closed, and in a third switching position of the valve the supply line is opened and the bypass line is closed.

4. In the apparatus of claim 3, wherein the stopcock plug (11) protrudes at an upper end beyond the housing and has a handle (10) for manual actuation.

5. In the apparatus of claim 4, wherein the handle (10) of the valve can be locked in the various rotary positions that correspond to the various switching positions of the valve.

6. In the apparatus of claim 5, wherein a switching position of the valve is detected and sent to a control unit.

7. In the apparatus of claim 6, wherein the stopcock plug (11) on a lower end opposite the handle has a connection flange (110) for securing the electrolyte cell.

8. In the apparatus of claim 7, wherein the stopcock plug (11) on the lower end has an open recess (18) which serves as a reservoir chamber (18) for the water, the conduits (180, 181) of the stopcock plug (11) discharge into the reservoir chamber (18), and the reservoir chamber (18) forms a portion of the bypass line inside the stopcock plug (11).

9. In the apparatus of claim 7, wherein the bypass line is embodied inside the housing (3) with a first of the bypass conduits (31) which branches off from the through conduit (30) near inflowing water and extends as far as the recess (39) that receives the stopcock plug (11), and with a second of the bypass conduits (32) which branches off from the through conduit (30) near outflowing water and which also extends as far as the recess (39) that receives the stopcock plug (11), the stopcock plug (11) beginning at a circumference has the conduit (180) for the inflow of the water into the reservoir chamber (18) and with the conduit (181) for the outflow of the water from the reservoir chamber (18) as far as the circumference of the stopcock plug (11), and depending on the switching position of the valve (1) according to the rotary position of the stopcock plug (11) about the longitudinal axis (M2) the bypass conduits (31, 32) of the housing (3) communicate with the conduits (180, 181) of the stopcock plug (11) and form the bypass line.

10. In the apparatus of claim 9, wherein the conduit (181) for the outflow of the water from the reservoir chamber (18) leads away from an uppermost point of the reservoir chamber (18), and the conduit (180) for the inflow of the water into the reservoir chamber (18) enters the reservoir chamber (18) in a middle region of the reservoir chamber (18).

11. In the apparatus of claim 10, wherein from the bypass line which leads from the electrolyte cell (2) to the supply line for the outflowing water a branch line (4) leads away and extends out of the housing (3).

12. In the apparatus of claim 11, wherein the electrolyte cell (2) has a multi-part structure with a solid-state electrolyte membrane (22) disposed between an anode (21) and a cathode (23) and the anode (21) contacts the water introduced into the reservoir chamber (18) of the stopcock plug (11).

13. In an apparatus for generating at least one of ozone, oxygen, hydrogen and other products of electrolysis of water, having an electrolyte cell that can be acted upon by water, the water being delivered and carried away in a supply line communicating with the electrolyte cell, the improvement comprising: a bypass line embodied around the supply line, the electrolyte cell connectable via the bypass line to the supply line and subjected to the water from the supply line, and a valve engaging the supply line and the bypass line and by the valve, the supply line and the bypass line can be at least one of opened and closed, a housing (3) having a through conduit (30) for the supply line and bypass conduits (31, 32) for the bypass line and having a recess (39), penetrating the supply line and the bypass line, the recess (39) receiving a stopcock plug (11), the stopcock plug (11) having a through bore (17) and conduits (180, 181) spaced apart from the through bore (17), the through bore (17) and the conduits (180, 181) extending transversely to a longitudinal axis (M2) of the stopcock plug (11), as a function of a rotary position of the stopcock plug (11) the through bore (17) of the stopcock plug (11) communicable with the through conduit (30) of the housing (3), and the conduits (180, 181) of the stopcock plug (11) communicable with the bypass conduits (31, 32) of the housing (3).

14. In the apparatus of claim 1, wherein in a first switching position of the valve the supply line and the bypass line are opened, in a second switching position of the valve the supply line and the bypass line are closed, and in a third switching position of the valve the supply line is opened and the bypass line is closed.

15. In an apparatus for generating at least one of ozone, oxygen, hydrogen and other products of electrolysis of water, having an electrolyte cell that can be acted upon by water, the water being delivered and carried away in a supply line communicating with the electrolyte cell, the improvement comprising: a bypass line embodied around the supply line, the electrolyte cell connectable via the bypass line to the supply line and subjected to the water from the supply line, and a valve engaging the supply line and the bypass line and by the valve, the supply line and the bypass line can be at least one of opened and closed, and a stopcock plug (11) protruding at an upper end beyond a housing (3) and having a handle (10) for manual actuation.

16. In the apparatus of claim 15, wherein the handle (10) of the valve can be locked in various rotary positions that correspond to various switching positions of the valve.

17. In the apparatus of claim 1, wherein a switching position of the valve is detected and sent to a control unit.

18. In the apparatus of claim 1, wherein the stopcock plug (11) on a lower end opposite the handle has a connection flange (110) for securing the electrolyte cell.

19. In the apparatus of claim 1, wherein the stopcock plug (11) on a lower end has an open recess (18) which serves as a reservoir chamber (18) for the water, the conduits (180, 181) of the stopcock plug (11) discharge into the reservoir chamber (18), and the reservoir chamber (18) forms a portion of the bypass line inside the stopcock plug (11).

20. In the apparatus of claim 1, wherein the bypass line is embodied inside the housing (3) with a first of the bypass conduits (31) which branches off from the through conduit (30) near inflowing water and extends as far as the recess (39) that receives the stopcock plug (11), and with a second of the bypass conduits (32) which branches off from the through conduit (30) near outflowing water and which also extends as far as a recess (39) that receives the stopcock plug (11), the stopcock plug (11) beginning at a circumference has the conduit (180) for the inflow of the water into a reservoir chamber (18) and with the conduit (181) for the outflow of the water from the reservoir chamber (18) as far as the circumference of the stopcock plug (11), and depending on the switching position of the valve (1) according to a rotary position of the stopcock plug (11) about the longitudinal axis (M2) the bypass conduits (31, 32) of the housing (3) communicate with the conduits (180, 181) of the stopcock plug (11) and form the bypass line.

21. In the apparatus of claim 1, wherein the conduit (181) for the outflow of the water from a reservoir chamber (18) leads away from an uppermost point of the reservoir chamber (18), and the conduit (180) for the inflow of the water into the reservoir chamber (18) enters the reservoir chamber (18) in a middle region of the reservoir chamber (18).

22. In the apparatus of claim 1, wherein from the bypass line which leads from the electrolyte cell (2) to the supply line for the outflowing water a branch line (4) leads away and extends out of the housing (3).

23. In an apparatus for generating at least one of ozone, oxygen, hydrogen and other products of electrolysis of water, having an electrolyte cell that can be acted upon by water, the water being delivered and carried away in a supply line communicating with the electrolyte cell, the improvement comprising: a bypass line embodied around the supply line, the electrolyte cell connectable via the bypass line to the supply line and subjected to the water from the supply line, and a valve engaging the supply line and the bypass line and by the valve, the supply line and the bypass line can be at least one of opened and closed, the electrolyte cell (2) having a multi-part structure with a solid-state electrolyte membrane (22) disposed between an anode (21) and a cathode (23) and the anode (21) contacting the water introduced into the reservoir chamber (18) of a stopcock plug (11).

* * * * *